3,029,660
BALL SCREW WITH STOP MEANS
Richard E. Sears, Birmingham, Mich., assignor to Beaver Precision Products, Inc., Clawson, Mich., a corporation of Michigan
Filed Nov. 5, 1959, Ser. No. 851,067
1 Claim. (Cl. 74—424.8)

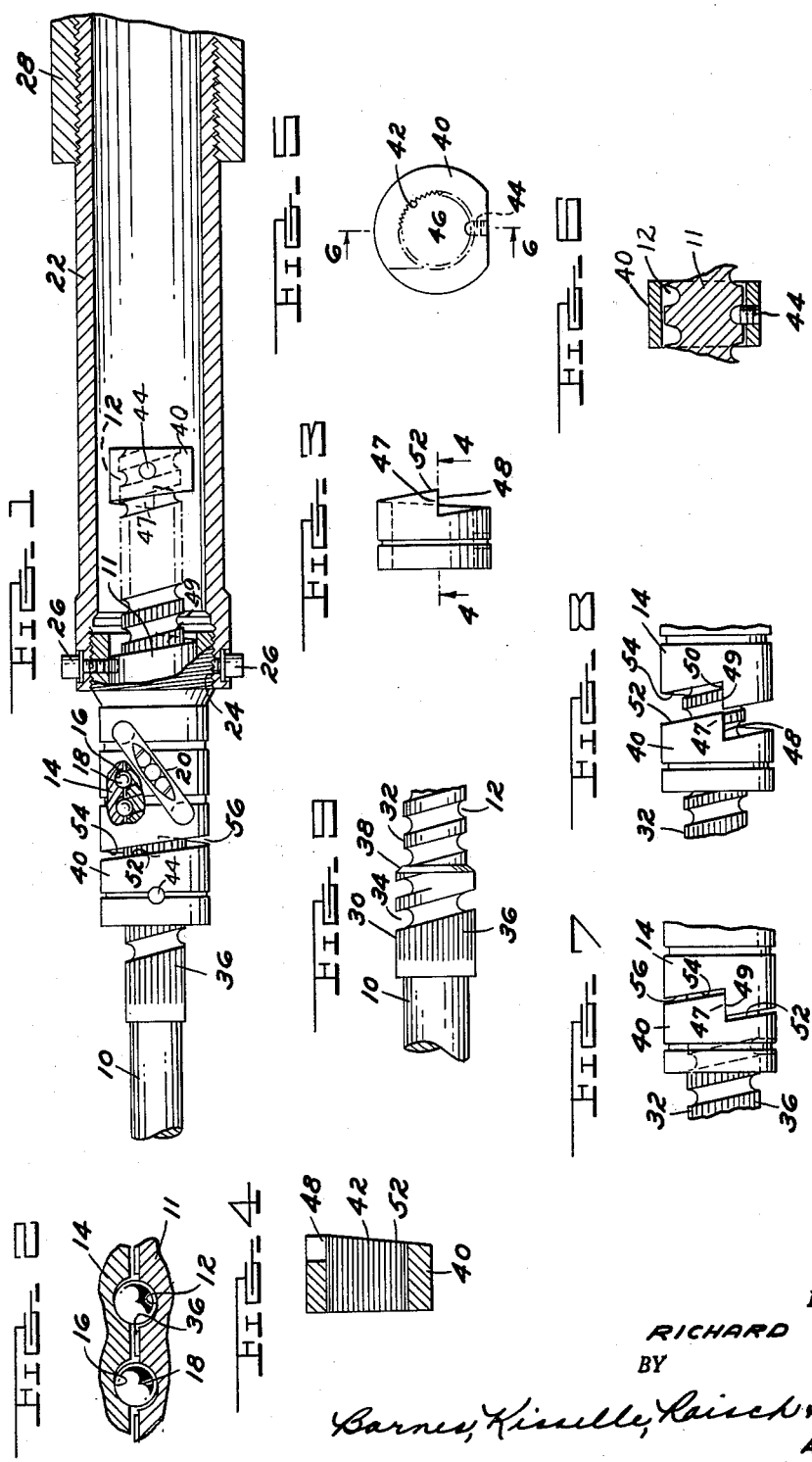
INVENTOR.
RICHARD E. SEARS
BY
Barnes, Kisselle, Raisch & Choate
ATTORNEYS United States Patent Office 3,029,660
Patented Apr. 17, 1962

This invention relates to ball screw assemblies and has to do more particularly with means for limiting the relative axial movement between the nut and the screw.

In many applications where ball screws are employed, the necessity arises for providing a stop to limit the axial movement of the nut or the screw, depending upon which of the two moves axially, to an accurately predetermined fixed position in either one or opposite directions. The provision of a stop member on the screw against which the nut is arranged to abut axially is not a satisfactory arrangement. Where the limiting position of the nut is obtained by having it abut axially against a stop member fixed on the screw, a high thrust is developed which in many cases can cause "brinelling" of the helical ball grooves on the nut and screw by the bearing balls in the assembly. Such axial abutment can also cause jamming of the nut against the screw stop face with such force as to require drastic means for release.

It is an object of the present invention to provide a ball screw assembly which incorporates a stop member designed to limit the relative axial movement between the nut and the screw by radial engagement exclusively between the stop member and the nut.

A further object of the present invention is to provide a stop arrangement for a ball screw assembly which enables limiting the relative axial movement between the nut and the screw in a highly accurate manner.

A further object of the present invention resides in the provision of stop means for a ball screw assembly which are designed for economical manufacture.

In the drawings:

FIG. 1 is a side elevational view partly in section of a ball screw assembly embodying the stop means arrangement of the present invention.

FIG. 2 is a fragmentary longitudinal sectional view of the assembly shown in FIG. 1 on an enlarged scale.

FIG. 3 is a side elevational view of one of the stop collars incorporated in the assembly of FIG. 1.

FIG. 4 is a sectional view along the line 4—4 in FIG. 3.

FIG. 5 is an end view of the stop collar shown in FIG. 3.

FIG. 6 is a sectional view along the line 6—6 in FIG. 5.

FIG. 7 is a fragmentary view showing the nut of the assembly abutting against one of the stop collars to limit the relative axial movement between the nut and the screw in one direction.

FIG. 8 is a view similar to FIG. 7 and showing the stop collar and the nut in the positions they occupy one revolution prior to the engagement of the nut with the stop member.

FIG. 9 is a fragmentary view of one end of a screw embodying a modified form of the invention.

Referring to FIG. 1, there is illustrated a ball screw assembly which includes a shaft 10 formed with a screw portion 11 having a helical ball thread 12. A nut 14 surrounds the screw portion 11 and is provided with an internal ball groove 16 which registers with ball groove 12. Between these two grooves are arranged a series of bearing balls 18 which interconnect the nut and the screw. The arrangement is such that relative rotation between the nut and the screw produces translatory movement of one of the members relative to the other. The bearing balls 18 are recirculated from one end of nut 14 back to the other end by means of a return tube 20 as is conventional.

In the particular assembly illustrated in FIG. 1, a sleeve 22 is threaded to one end of nut 14 as at 24 and is locked thereon by means of lock screws 26. The other end of sleeve 22 is threaded to a member 28 which may be a machine component which is actuated by the ball screw assembly. The arrangement thus far described is more or less conventional and is presented by way of description rather than limitation.

Referring now to FIG. 2, it will be observed that screw 11 is formed around its periphery with a plurality of straight, axially extending shallow splines or serrations 36. The splines or serrations 36 do not extend axially to the edges of the adjacent convolutions of ball groove 12. Between successive convolutions of groove 12, these serrations terminate just short of the edges of the ball groove so as to eliminate the problem of burring. The inner diameter of nut 14 is slightly greater than the outer diameter of the screw measured at the crests of serrations 36. Serrations 36 extend the full length of screw 11.

At each end of screw 11, there is arranged a stop collar 40. Each collar 40 is provided internally thereof with axial serrations or splines 42 of like size and number as the serrations or splines 36 around the periphery of the screw. Each collar 40 is adapted to be slipped over the end of shaft 10 or screw 11, as the case may be, and over the serrated portion of the screw so as to interengage the serrations 42 on the collars with the serrations 36 on the screw and thereby fix each of the collars 40 on the screw against rotation.

A radially extending locking screw 44 on each collar 40 has a ball shaped inner end 46 dimensioned to snugly embrace ball groove 12. It will be appreciated that the serrations 36, 42 cooperate with the locking screws 44 and the ball groove 12 to fix each collar 40 both radially and axially on screw 11 when the locking screws 44 are tightened to interengage the ball ends 46 with groove 12.

Each collar 40 is fashioned with a dog 47 formed with a stop face 48 which lies in a radial plane extending axially. Nut 14 is likewise provided at each of its opposite ends with a dog 49 formed with a stop face 50 which lies in a radial plane that extends axially. The adjacent end faces 52, 54 of collars 40 and nut 14, respectively, are axially relieved relatively to the dogs 47, 49. For the purpose of illustration, these faces are shown generally helically shaped.

When the stop faces 48, 50 of either collar 40 and the adjacent end of nut 14 are in abutting or engaged relation, the nut 14 and collar 40 assume the relative positions illustrated in FIG. 7. In this position, there is a slight clearance space 56 between the adjacent end faces 52, 54 of the collar 40 and nut 14, respectively. In other words, when either of the stop faces 50 of nut 14 comes into angular engagement with the stop face 48 on one of the collars 40, the collar 40 is subjected exclusively to torque as distinguished from axial thrust. With respect to the shaft portion 10, this torque is resisted by the interengaged serrations 36, 42 on the screw and on the interior of collar 40, respectively.

It is, of course, desirable that the contact area between the stop faces 48 and 50 be maintained as large as possible. One way of achieving this is to design the assembly so that the dogs 47, 49 just by-pass one another before they rotate to a position wherein the stop faces 48, 50 are in coplanar engagement. Where each end of the nut 14 and each collar 40 is provided with a single dog as illustrated, then it is necessary to so locate stop faces 48, 50 with respect to the helical groove 16 on the nut 14 so that dog 47 just clears the dog 49 at a point one revolution prior to angular engagement of stop faces 48, 50. Thus, when a single dog is employed on the stop collar and on the nut, the maximum axial extent of interengagement of the two stop faces can correspond to just slightly less than the lead of the ball groove 12. If two sets of dogs are employed on the nut and collar, then the axial extent of interengagement of each set of stop faces can correspond to just slightly less than one-half the lead of the ball groove on the screw. Regardless of the number of dogs employed on the stop collar and on the nut, the stop faces of the dogs should be so located relative to the ball groove on the nut such that the mating dogs just clear one another as they rotate into axial alignment just prior to full engagement of the stop faces.

The amount of axial clearance between the leading edges of the dogs 47, 49 in the position shown in FIG. 8 will depend upon the axial position of collar 40 on the section 30 of the ball screw. This in turn is controlled by the location of locking screw 44 both axially and radially relative to the stop face 48. The location of screw 44 on collar 40 is predetermined in relation to the location of stop face 48 such that when the screw 44 engages the ball groove 12, the leading edges of dogs 47 and 49 will just by-pass one another prior to full engagement. Once this relationship is established between the location of screw 44 and stop face 48, then regardless of the axial position of either collar 40 on the ball screw 11, the dog faces 48 and 50 will just by-pass one another as long as locking screw 44 of each collar 40 snugly embraces the ball groove 12.

With the above described arrangement, when the nut 14 engages either of the collars 40, the interengagement of these members is purely in a radial or circumferential direction. Thus, the screw 11 is not subjected to any axial thrust which might tend to produce jamming or "brinelling" of the ball groove 13 or the ball groove 12. In addition, with this arrangement, movement of the nut axially of the screw can be limited to accurately predetermined positions. Furthermore, the limited positions of nut 14 on the screw can be adjusted as desired. For example, if it is desired to limit the travel of nut 14 to the left on screw 11 to a position slightly to the right of that shown in FIGS. 1 and 7, it is only necessary to loosen locking screw 44, slip the left collar 40 off the ball screw, rotate it one serration in a clockwise direction as viewed from the left, slip the collar back on the serrated surface of screw 11 and then again lock screw 44 in the ball groove 12. In this way, collar 40 at the left will be securely locked in a position shifted slightly to the right as compared to its position in FIGS. 1 and 7; and the extent to which it is shifted to the right depends upon the lead angle of groove 12 and the extent to which the collar is rotated when it is reassembled on the serrated portion 30 of the ball screw.

It will be appreciated that if the screw is serrated as illustrated throughout its axial extent, infinite adjustment of both stop collars along the screw is obtainable. It is only necessary to enable each of the collars to be slipped off the serrated portion of the screw and rotated a desired amount and thereafter slipped back unto the serrated portion of the screw. It will be appreciated, of course, that in applications where it is necessary to accurately limit the movement of the nut at only one axial extremity, only one end portion of the screw need be serrated. For example, referring to FIG. 9, if only one stop collar 40 is required at the end of screw 11 adjacent the shaft portion 10, then the serrated portion 30 of the screw can have a larger diameter than the portion 32 of the screw which need not be serrated. The two portions 30, 32 are connected by a shoulder 38. The collar 40 would then be adjustable axially on the serrated portion 30 of the screw. However, the helical ball groove 12 would extend continuously around the portions 32 and 30 and would terminate at one end on the portion 30 as at 34.

I claim:

In a ball screw assembly, the combination of a screw member having an external helical ball groove, a nut member on the screw member having an internal helical ball groove registering with the ball groove on the screw member, a plurality of balls interengaging said grooves so that rotative movement of one of said members produces translatory movement of the other, said screw member having a plurality of axially extending serrations around the outer surface portion thereof formed with said ball groove, a collar having like serrations internally thereof and engaging serrations on the screw member to fix the collar on the screw member against rotation, a radially extending locking screw on said collar adjustable thereon to interengage with the portion of the helical ball groove on the screw extending into said collar, said locking screw when engaging said helical groove preventing relative axial movement between the screw member and the collar and axially extending stop faces on the adjacent ends of the nut member and collar adapted when interengaged to limit the relative axial movement between the nut and screw members in one direction, said serrations being relatively fine and small in a circumferential direction so that the stop face on the collar can be adjusted circumferentially around the screw in very small increments.

References Cited in the file of this patent

UNITED STATES PATENTS

| | | |
|---|---|---|
| 742,173 | Dillon | Oct. 29, 1903 |
| 808,273 | Darlington | Dec. 26, 1905 |
| 1,283,386 | Wenzelmann | Oct. 29, 1918 |
| 2,446,393 | Russell | Aug. 3, 1948 |
| 2,590,251 | Hoover | Mar. 25, 1952 |
| 2,715,341 | Hogan | Aug. 16, 1955 |
| 2,739,491 | Russell | Mar. 27, 1956 |
| 2,749,812 | Wetzel | June 12, 1956 |
| 2,876,653 | Meyer | Mar. 10, 1959 |
| 2,936,645 | Morris et al. | May 17, 1960 |

FOREIGN PATENTS

| | | |
|---|---|---|
| 481,413 | Great Britain | Mar. 10, 1938 |